Patented June 3, 1924.

1,496,506

UNITED STATES PATENT OFFICE.

GLEN LENARDO WILLIAMS, OF DETROIT, MICHIGAN, ASSIGNOR TO RANDALL WILLIAMS COMPANY, OF DETROIT, MICHIGAN, A CORPORATION OF MICHIGAN.

RUST AND GREASE REMOVER.

No Drawing.   Application filed July 15, 1922.   Serial No. 575,337.

*To all whom it may concern:*

Be it known that I, GLEN LENARDO WILLIAMS, a citizen of the United States of America, residing in the city of Detroit, in the county of Wayne, in the State of Michigan, have invented certain new and useful Improvements in a Rust and Grease Remover, of which the following is a specification.

The object of my invention is to provide an efficient rust and grease remover, which, when applied to a surface of iron or steel, rusted and covered with grease or oil, will act upon the rust and upon the grease or oil in such manner that they may readily be washed or wiped off, leaving the surface clean.

To illustrate the manner in which the liquid constituting my discovery is prepared, a gallon of water is placed in a receptacle and about two pounds of soluble sodium or potassium salts are added thereto. These salts may be the phosphates, chlorates, bromates, nitrates, or any other salts soluble in water, a single salt or a combination of salts being used, as desired. Sufficient mineral acid is used to make the solution of acid reaction, the salts are completely dissolved, and the solution made to a strength of about 8° to 15° Bé., the amount of the salts and acids used being varied according to needs.

Separately, about a pint of an alcohol from any group of alcohols, but preferably furfuryl, as being less inflammable than others, is treated with about a half of a pint of glacial acetic acid, butyric acid, or lactic acid, singly or in any combination, with the use of heat, to form the corresponding ester or esters as furfuryl acetate or butyrate, and the ester or esters are then added to the first solution. To the combined solutions is added about an ounce of molasses, or sugar solution, or an equivalent carbohydrate, as starch.

The acid mixture is neutralized by manganese borate, such as is used in hardening linseed oil. This neutralizes the acid or acids in the solution and will form manganese and boron salts which will act on oils used in the paints subsequently used upon the metal, to harden the primers. When paint is sprayed or otherwise applied to the cleaned surface, there will be enough iron sulphate, manganese sulphate, and boron salts on the surface to help harden the oil in the priming coat.

The acetates, butyrates, or lactates of furfuryl or other alcohols will remove the furfuryl or other alcohols will remove the iron rust into compounds which may readily be removed. Beneath moldings or in hinge crevices in automobile bodies, the iron rust and grease will be converted into substances which will dry out with the aid of heat, and will be favorable to paint on the metal surface instead of injurious.

It will be obvious that the proportions given above will be varied to suit different ingredients and that chemical equivalents may be substituted for the substance recited without departing from the principles of the invention. The metallic salts used may be practically any water-soluble salt or salts of metals either electro-positive or electro-negative to iron, though those electro-negative to iron are more desirable.

I claim:

1. A rust remover comprising a solution resulting from the mixture of a salt of an alkali metal, a mineral acid, an alcoholic ester, borate of manganese, and molasses.

2. A rust remover comprising a solution resulting from the mixture of a water-soluble salt of a metal electro-negative to iron, sulphuric acid, furfuryl acetate, borate of manganese, molasses, and water.

3. A rust remover comprising a solution resulting from the mixture of a water-soluble metallic salt, a mineral acid, an alcoholic ester of an organic acid, borate of manganese, and a carbo-hydrate.

4. The process of making a rust remover which consists in preparing an aqueous solution of a salt of an alkali metal, acidifying the solution with a mineral acid, adding thereto a mixture of an alcohol with an organic acid, then adding a carbo-hydrate, and neutralizing the solution with manganese borate.

In testimony whereof, I affix my signature.

Signed on the 5th day of July, 1922, in the city of Detroit, in the county of Wayne, in the State of Michigan.

GLEN LENARDO WILLIAMS. [L. S.]